Figures 1, 2, 3, 4:
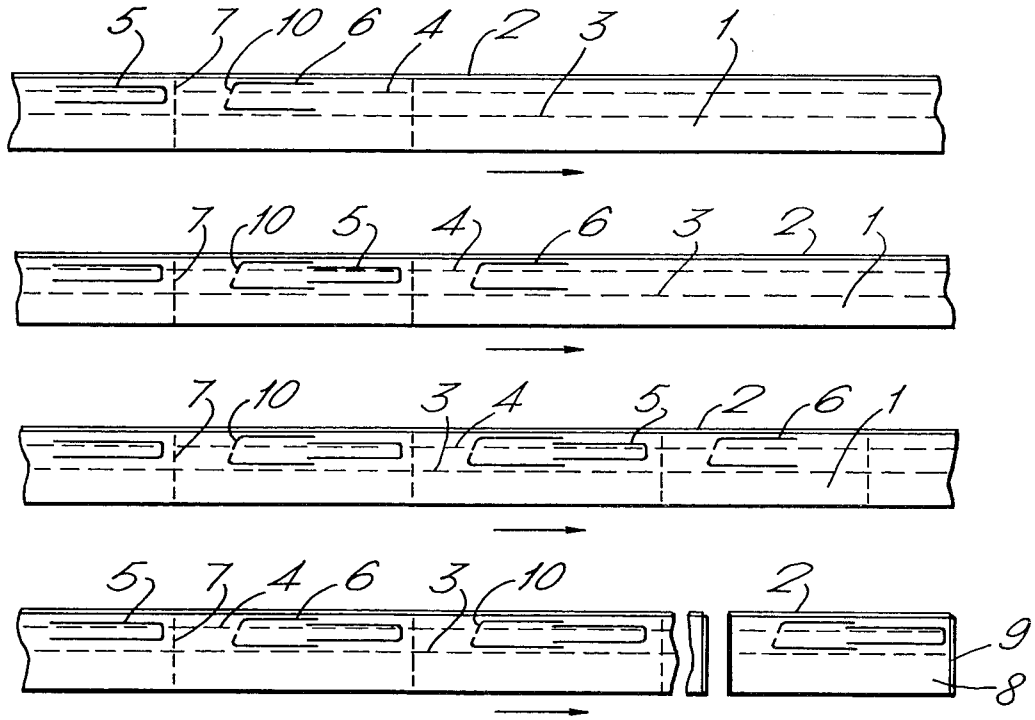
Figures 5, 6, 7, 8:
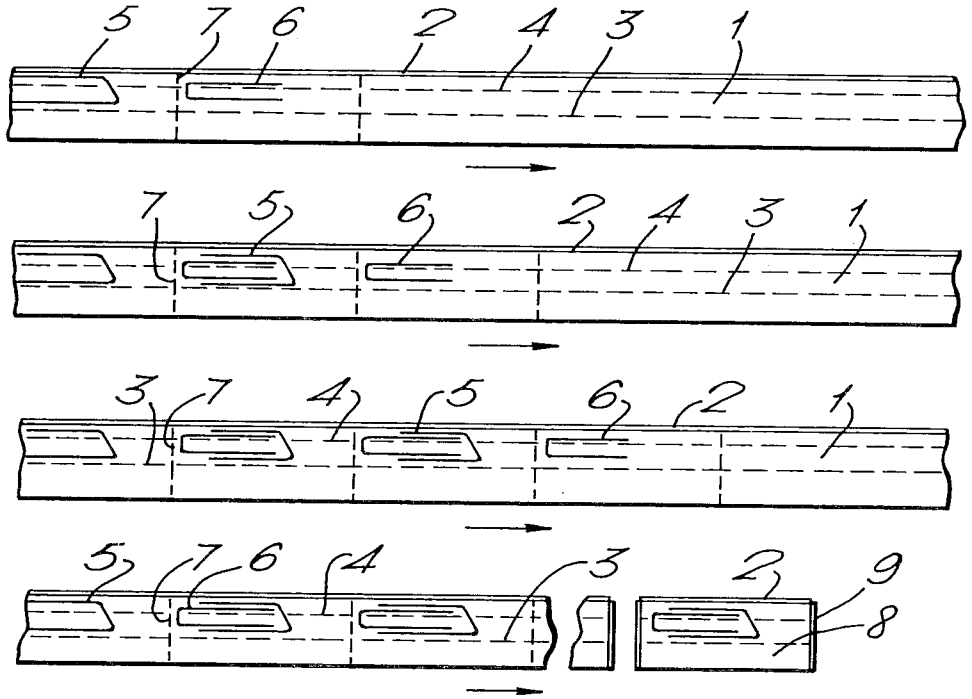
Figure 9:
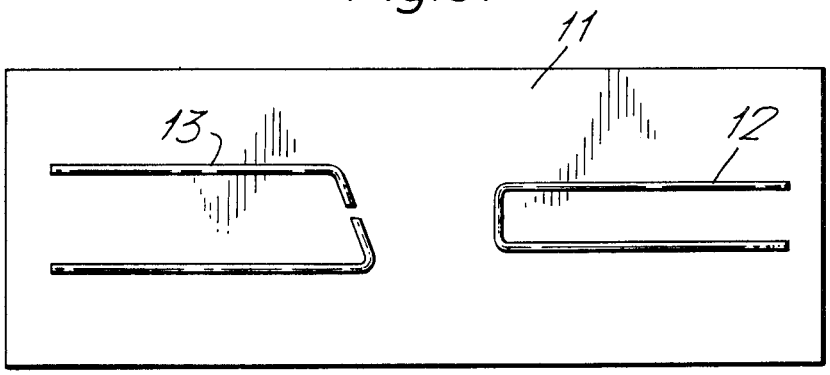
Figure 10:
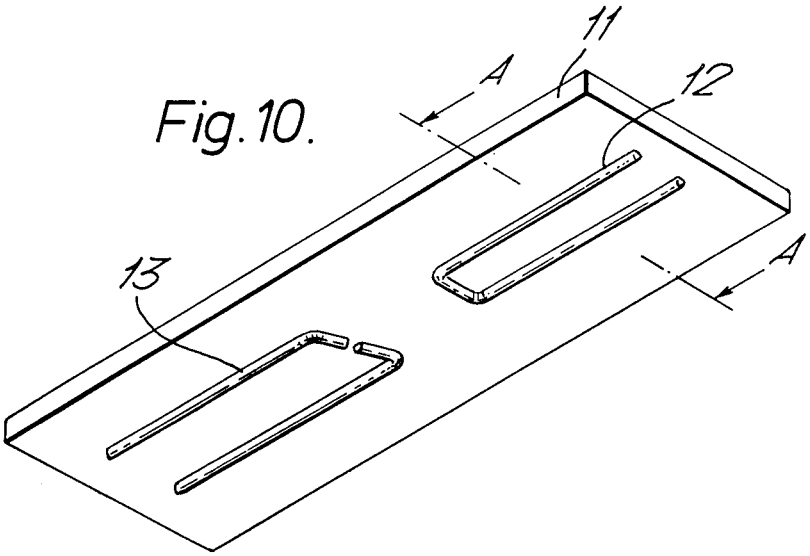
Figure 11:
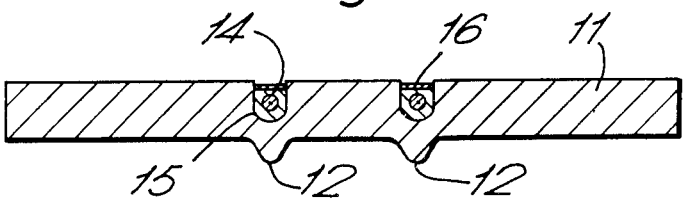

United States Defensive Publication [19] (H) [11] T966,002

Barnes et al. [43] Jan. 3, 1978

[54] PLASTICS BAGS PRODUCTION

[75] Inventors: John Grover Barnes, Brampton; Charles Robertson Murray, Toronto, both of Canada

[73] Assignee: Imperial Chemical Industries Limited, London, England

[21] Appl. No.: 778,926

[22] Filed: Mar. 18, 1977

[30] Foreign Application Priority Data

Mar. 23, 1976 United Kingdom ..... 11632/76

[51] Int. Cl.[2] ..... B31B 1/84

[52] U.S. Cl. ..... 93/8 VB; 93/35 R; 93/DIG. 1

[57] ABSTRACT

In the production of plastics bags, especially valved bags, from a web of plastics material by folding in the side margins of the web to form overlapping panels which are then longitudinally heat-sealed together for a major portion of one bag length, and then heat-sealing the web transversely and severing the web at intervals to produce individual bags, the two overlapping panels are heat-sealed together by forming two longitudinal seals which partially overlap to provide a forward longitudinal seal and a rear longitudinal seal with respect to the direction of travel of the web, the rear longitudinal seal of each bag being formed simultaneously with the forward longitudinal seal of the adjacent following bag. The apparatus for producing said bags comprises a pair of heat-sealing elements equipped for simultaneous operation and arranged for forming the rear seal in one bag and the forward seal in the following adjacent bag. The two elements may be a fixed distance apart, and at least one has suitably a hairpin shape.

10 Claims, 3 Sheets Drawing,

11 Pages Specification

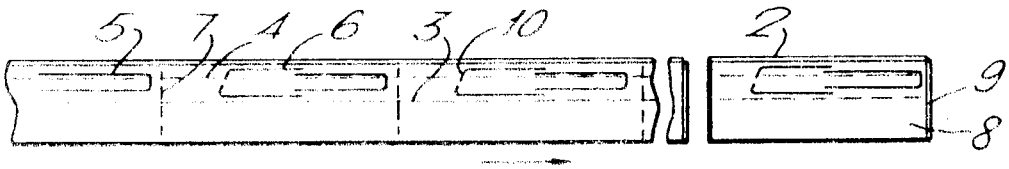

The file of this unexamined application may be inspected and copies thereof may be purchased (849 O.G. 1221, Apr. 9, 1968).